July 1, 1969    L. L. BLACKMER    3,453,640
DIFFRACTION GRATING RECORDING
Filed March 28, 1967

LEROY L. BLACKMER
INVENTOR.

BY *Morton A. Polster*

ATTORNEY

LEROY L. BLACKMER
INVENTOR.

United States Patent Office 3,453,640
Patented July 1, 1969

3,453,640
DIFFRACTION GRATING RECORDING
Leroy L. Blackmer, Rochester, N.Y., assignor to Eastman Kodak Company, Rochester, N.Y., a corporation of New Jersey
Filed Mar. 28, 1967, Ser. No. 626,608
Int. Cl. G01d 9/02
U.S. Cl. 346—1     9 Claims

ABSTRACT OF THE DISCLOSURE

Method and apparatus for recording digital data in the form of a plurality of diffraction gratings of individually unique spatial frequencies effectively superimposed one upon another, each individual grating being produced as the result of an interference pattern created by the intersection of two beams of coherent light of corresponding wave length and polarization. Selective control of the recording of a respective diffraction grating is provided by means which cyclically alters the phase relationship of the two interfering beams at their point of intersection, thereby "smearing" the record of that particular interference pattern.

Background of the invention

This invention relates to information storage and retrieval systems, and more particularly, to a method and apparatus for recording digital data on photographic film in the form of a plurality of superimposed diffraction grating patterns.

Although the recording of binary information on photographic film in the form of light and dark portions indicative of binary bits has been well known for some time, these prior art systems have never been very satisfactory due to the difficulty of maintaining proper alignment of the film in read-out apparatus, and also due to the more serious problem of loss of information resulting from dirt, dust and/or imperfections in the film medium itself. Recently, in U.S. patent application Ser. No. 306,057, filed Sept. 3, 1963, R. L. Lamberts and G. C. Higgins, now Patent No. 3,312,955, disclosed a novel information storage and retrieval system which overcomes the dirt and alignment problems which have normally plagued film storage systems. According to the Lamberts and Higgins system, binary information is recorded on film in the form of a composite diffraction grating comprising a plurality of superimposed line patterns of individually unique frequencies, each different grating pattern corresponding to a particular binary bit. When light is directed through the superimposed grating patterns, a strong first-order diffraction line appears for each unique line pattern included in the composite grating. For instance, a 7-digit binary numeral is recorded in the form of 1 to 7 superimposed diffraction gratings, the presence or absence of a particular line grating resulting in the presence or absence of its corresponding first-order diffraction line during read-out and being indicative of the "1" or "0" value of its corresponding binary bit. Since each of the individual line patterns appears throughout the entire composite grating area (i.e., since each segment of the superimposed grating areas carries the information relating to all seven bits), read-out apparatus tolerances are greatly increased, and dirt problems are minimized.

Improvements on the Lamberts and Higgins system have already been made, namely, methods and apparatus in which the superimposed diffraction gratings are recorded on film by utilizing interference patterns produced at the intersection of a reference beam and plurality of signal beams of coherent light. The beams are of corresponding wave length and polarization and they are directed by means such as beam splitters, prisms, and mirrors, along different respective paths.

In one such prior art improvement disclosed in copending U.S. application Ser. No. 551,054, filed May 18, 1966, by H. O. Hoadley, now Patent No. 3,407,405, the signal beams are modulated by means which selectively alter their respective polarization by ninety degrees relative to the reference beam to prevent interference, thereby selectively controlling the recording of any particular single-frequency grating. According to another prior art recording system disclosed in copending U.S. application 551,055 filed May 18, 1966, by D. L. MacAdam, now Patent No. 3,364,497, a mirror in the path of each signal beam is supported by a piezo-electric crystal. When it is desired to omit a single-frequency grating from the combined grating pattern, one of the piezo-electric crystals is energized, causing its mirror to deflect sufficiently to direct its corresponding signal beam away from the recording area.

However, these prior art systems are relatively uneconomical and inefficient. The Hoadley system, which uses birefringent optical devices, is extremely expensive, and the inertia of the MacAdam mirror system prevents its satisfactory operation at the high speeds demanded by current data storage standards (e.g., recording rates of 15,000 seven-bit characters per second). Further, film record members produced according to the MacAdam recording system are not entirely satisfactory due to the great extremes of film density occurring in the record member itself. That is, when all binary digits are present in a recorded numeral, thereby requiring that all component diffraction gratings be present in the composite grating, the resulting film density is very high. On the other hand, when only a single digit appears in a recorded numeral, only a single diffraction grating is required, resulting in very low density of the record area. When reading out digital data recorded in this manner, the wide variation in film record densities results in a similarly wide variation in the intensity of the digit signals (first-order diffraction lines), and, therefore, difficulties are encountered in designing photoelectric read-out apparatus which can operate efficiently with such relatively great latitude of signal light intensity.

Summary of the invention

In the diffraction grating recording method and apparatus disclosed herein, a mirror in the path of each signal beam is supported by a control means which is selectively operable in response to a respective digit signal. Actuation of the control means causes cyclical vibration of the mirror. This vibration may be either lateral or angular. If the mirror is caused to vibrate angularly, it sweeps its respective signal beam through a constantly changing angle of intersection with the reference beam; and if, as in the preferred embodiment herein, the mirror is moved laterally along a line normal to the plane of the mirror, the angle of intersection with the reference beam remains the same, but the distance through which the signal beam travels is cyclically altered with respect to the point of intersection. In either case, actuation of the mirror control means causes a cyclical alteration of the phase of the signal beam relative to the reference beam and results in the creation of a moving interference pattern formed by an infinite number of line patterns, each slightly displaced from the next, but all remaining within the recording area. Therefore, during actuation of the control means, interference between the reference beam and the cyclically altered beam results in the production of an effectively uniform point-by-point exposure across the recording area of the record member.

Thus, when not being cyclically altered by its respective control means, each signal beam interferes with the reference beam to produce on the recording medium a single, stationary, "readably-distinct" line pattern of an individually unique spatial frequency. That is, this exposure results in the production of a discrete line grating on the recording medium through which read-out light may be passed to form a particular, relatively intense, first order diffraction line. However, during actuation of the control means, this normally present line grating is effectively "smeared" on the recording medium so that no respective readably-distinct line pattern is formed. Nevertheless, since the intensity of the signal beam does not change, the integrated exposure of the record medium by the signal beam, averaged over the recording area, remains substantially constant at all times. Therefore, regardless of the number of different readably-distinct line patterns recorded in any particular composite grating pattern, the average density of each succeeding composite grating pattern remains relatively constant, thereby avoiding the undesirable extremes in readout intensity referred to above.

It is an object of this invention to provide an efficient and practical method of selectively recording a plurality of single-frequency diffraction gratings in the form of a combined superimposed grating pattern.

It is another object of this invention to selectively record such diffraction gratings by means of interference patterns created by the intersection of a plurality of beams of coherent light having the same wave length and polarization.

It is a further object to improve recording of such diffraction grating patterns whereby, regardless of the number of single freguency grating patterns present in any composite grating, the overall density of the composite pattern remains substantially constant.

Yet another object is to accomplish such selective grating recording by cyclically altering the phase of a signal beam relative to a reference beam to "smear" the normally present interference pattern created by the intersection of said beams.

Other objects, advantages and characteristic features of the subject invention will be in part obvious from the accompanying drawings, and in part pointed out in the following detailed description of the invention in which reference will be made to the accompanying drawings wherein like reference characters designate corresponding parts, and in which.

Figure 3:
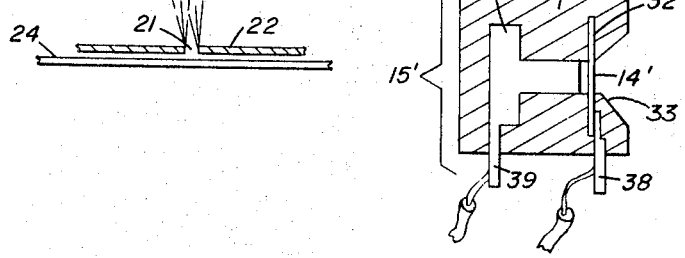
Figure 4A:
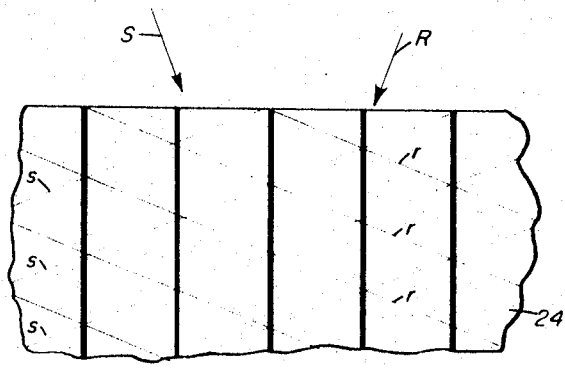
Figure 4B:
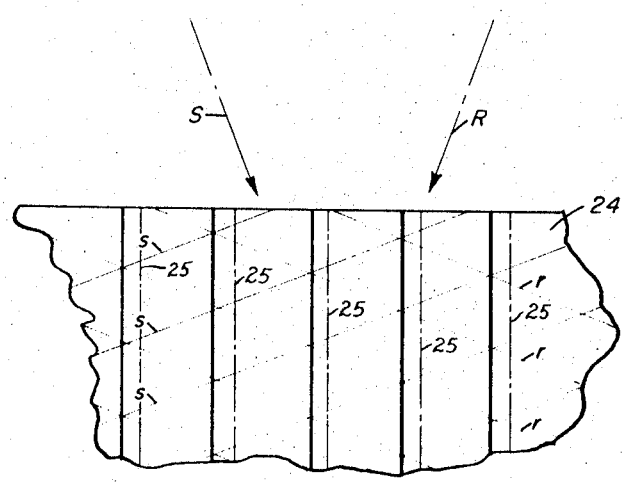
Figure 4C:
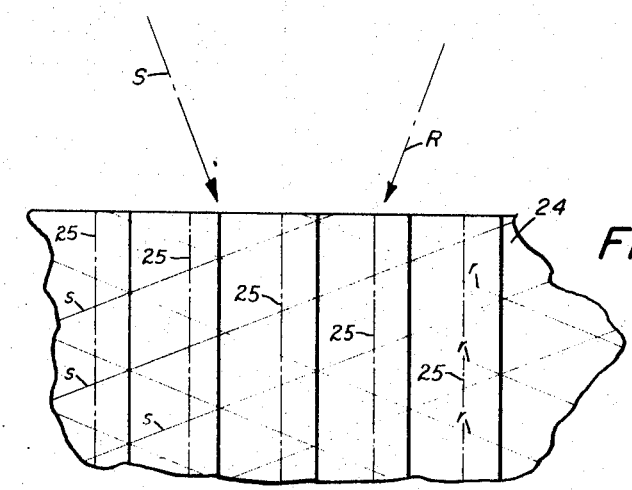

FIG. 3 is a cross-sectional view of the preferred embodiment of control means for cyclically altering the phase of the signal; and FIGS. 4A, 4B and 4C illustrate, schematically, interference patterns formed in a photosensitive record member by intersection of the reference beam with one signal beam. FIG. 4A indicates the normal, stationary interference pattern by means of which a diffraction pattern is recorded on the record member, while FIGS. 4B and 4C indicate the effect of cyclical phase alteration of the signal beam relative to the reference beam, these latter figures representing two instantaneous patterns of the resulting continuum of interference patterns which are effectively "smeared" on the recording medium.

Figure 1:
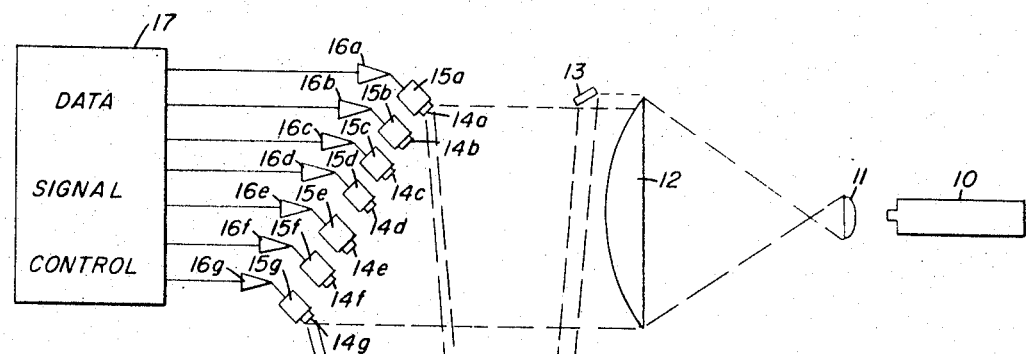
FIG. 1 is a schematic diagram of the data recording system according to the invention.

Referring now to FIGURE 1, apparatus for carrying out the method disclosed herein is illustrated schematically. A beam of coherent light, preferably generated by laser source 10, is spread by cylindrical lenses 11 and 12 and is directed at reference beam mirror 13 and data signal beam mirrors 14a–14g. Each of the signal beam mirrors is mounted on a respective control device 15a–15g, each control device being selectively energized by digital data signals generated by control circuitry 17 and amplified by respective amplifiers 16a–16g. Reference beam mirror 13 and signal beam mirrors 14a–14g each intercepts a respective portion of the source beam and directs it to a recording area 21 delineated by aperture plate 22 masking the film record member 24. As is known in the art, the signal beam mirrors are positioned so that the respective portions of the source beam reflected by each is directed along a distinct path intersecting the beam reflected by reference mirror 13 to cause these beams to interfere at recording area 21.

When imaged on film record member 24, each of the interference patterns created by the intersection of the reference beam with one of the data signal beams forms a stationary line grating pattern of a respectively different spatial frequency. Therefore, when all seven signal beam mirrors 14a–14g are in their normally fixed positions, the interference patterns appearing at recording area 21 are imaged on film 24 as seven different, readably-distinct gratings effectively superimposed one upon another in a composite pattern.

As noted above, the presence of all seven individual gratings might be indicative of the binary numeral "111111." To record a different binary numeral, at least one of the binary digits must be changed to "0" and, as noted above, the "0" value can be indicated by the absence of a particular one of the single-frequency gratings. This is accomplished as follows: for instance, to record a composite diffraction pattern indicative of the binary numeral "0110110," appropriate control signals are generated by circuitry 17 and delivered through amplifiers 16a, 16d and 16g to respective mirror control devices 15a, 15d and 15g. These control signals result in the cyclical movement of mirrors 14a, 14d and 14g, thereby changing the paths of their respectively reflected signal beams. The movement of the mirrors may be angular, about an axis of rotation perpendicular to the plane established by the signal beam paths, but preferably each control device moves its respective mirror laterally, back and forth along a line normal to the plane of its surface.

Figure 2:
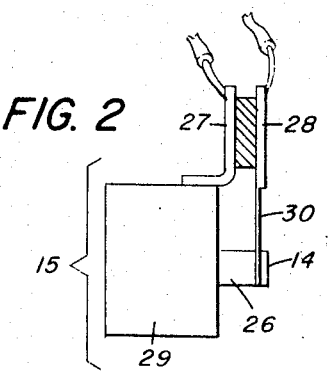
FIG. 2 is a plan view of one embodiment of the control means for cyclically altering the phase of each signal beam.

Two embodiments of such control devices are illustrated in FIGURES 2 and 3. In the embodiment illustrated in FIGURE 2, ceramic piezoelectric transducer 26 is connected to electrodes 27 and 28 through, respectively, a massive conductive mounting block 29 and resilient conductive strip 30. Aluminized glass mirror 14 is fixed to and moves with the surface of piezoelectric transducer 26. In a manner well known in the art, the cyclical energization of electrodes 27 and 28, e.g., by a delta wave voltage, will cause a cyclical variation in the physical dimensions of piezoelectric transducer 26, thus producing the desired cyclical lateral movement of mirror 14.

In the preferred embodiment of a mirror-control device shown in FIG. 3, mirror 14' comprises an aluminum reflecting film supported on the surface of an elastic diaphragm 32 which is stretched across a circular aperture 33 formed in a mounting block 34. Below mirror diaphragm 32, and separated from it by a small air space, is backing plate 36. Electrodes 38 and 39 provide appropriate electrical connection, respectively, with the mirrored aluminum surface of elastic diaphragm 32 and with backing plate 36. The assembly resembles a capacitor microphone but operates in an inverse manner. If an alternating potential (e.g., a delta wave input) is applied between elastic diaphragm 32 and backing plate 36, the diaphragm will be attracted to the backing plate on each half cycle. That is, it will be excited into cyclical lateral movement, vibrating at twice the applied signal frequency.

The cyclical movement of any of the mirrors 14a through 14g, results in a cyclical change of the path of its respectively reflected signal beam. This causes the signal beam to travel through cyclically longer and shorter paths prior to its intersection with the reference beam and thereby results in a cyclical alteration of its phase relative to the reference beam at the recording area.

The effect of this cyclical phase alteration is illustrated in FIGURE 4A, 4B and 4C. In each of the figures, a small portion of the surface of film record member 24 is shown schematically in greatly magnified cross-section, and in each case the pattern illustrated is limited only to a single signal beam S as it interferes with the reference beam R.

FIGURE 4A illustrates the normal stationary interference pattern which occurs when it is desired to record a diffraction grating on film 24, the phase of signal beam S being held constant in relation to reference beam R. The respective wave fronts s and r intersect as illustrated, and the regions of interference maxima are indicated by the points of intersection of each of the fronts. These points of interference maxima represent regions of maximum exposure of the film and are recorded thereon as a line grating pattern of a particular spatial frequency, as indicated by the heavy vertical lines.

FIGURES 4B and 4C indicate two instants of time during a period when the path of signal beam S is being cyclically altered. During the instant schematically illustrated in FIGURE 4B, it is assumed that the phase of signal beam S is retarded relative to the phase of reference beam R, and it can be seen that the regions of interference maxima, at this instant, have moved to the left relative to broken lines 25 which represent the normal regions of interference maxima shown in FIGURE 4A. In FIGURE 4C, an instant is shown in which the phase of signal beam 4C is advanced relative to reference beam R, the regions of interference maxima being moved to the right of the normal position as represented by broken lines 25.

It should be understood that FIGURES 4B and 4C each illustrate an interference pattern resulting at some instantaneous moment during the cyclical alteration of signal beam S, and that the vertical lines appearing in these figures are merely respresentative of two instantaneous patterns taken from a continuum of interference patterns whose regions of maximum brightness move back and forth to the left and right of the normal position indicated in FIG. 4A so long as the control signal cyclically moves its corresponding mirror to alter the path of signal beam S. This movement of the interference line pattern causes film 24 to be exposed to a continuum of such lines which it records as merely an effectively uniform point-by-point exposure.

However, it should be noted that whether any particular signal beam is forming a readably-distinct line pattern, as in FIGURE 4A, or is going through a cyclical alteration which results in the exposure of the film record member to an effectively uniform point-by-point intensity, the integrated intensity of the signal beam appearing in the recording area remains substantially constant. Therefore, regardless of the numerical value of the digital numeral being recorded, i.e., regardless of the number of definite readably-distinct line patterns present in any particular composite grating pattern, the integrated density of the film record member remains substantially the same. This just-described feature of the novel method and apparatus disclosed herein facilitates the design of read-out equipment as noted above.

Attention is also called to the fact that the method of cyclical phase-alteration just described above may be carried out by apparatus (such as that illustrated in FIGS. 2 and 3) in which the cyclical motion imparted to the data signal beam mirrors is of extremely small excursion, e.g., about one-half wave length of the source beam. Such small movements can be accomplished with relatively low power consumption and can be carried out at relatively high frequencies, therefore permitting economical recording of information at satisfactorily high speeds.

Finally, it should be understood that the term "cyclical," as used hereinabove and in the appended claims, is not limited to its connotation of repetitive motion which is exactly the same on each recurrence. To the contrary, it is specifically intended that "cyclical" should refer to "quasi-cyclical" motion as well, i.e. ,to repetitive motion wherein phase, amplitude and/or periodicity may vary randomly for each recurrence.

It should be understood that the specific embodiments of the present invention described hereinabove have been selected to facilitate the disclosure of the invention rather than to limit the particular form which the invention may assume, and that various modifications and alterations may be made to the specific forms shown in order to meet the requirements of practice without in any manner departing from the spirit or scope of the invention.

What is claimed is:

1. The method for producing a composite diffraction grating comprising a plurality of line patterns effectively superimposed one upon another, said method including the known steps of directing a reference beam and a plurality of signal beams of coherent radiation of corresponding wavelength and polarization along respective different paths intersecting with one another in the same predetermined area of a recording medium so that the interference of each said signal beam and the reference beam will normally produce a single, stationary, readably-distinct line pattern of an individually unique spatial frequency on said medium, the improvement comprising the step of:

selectively controlling at least one signal beam to alter cyclically its path relative to said reference beam path while maintaining its intersection with said reference beam at said recording area, such alteration varying in a corresponding manner the phase, at said area, of said signal beam relative to the reference beam to form a moving interference pattern at said area, thereby smearing the distinct line pattern normally produced by that particular signal beam to alter the composition of said composite grating.

2. In diffraction grating recording apparatus of the type wherein a reference beam and a plurality of signal beams of coherent radiation of corresponding wavelength and polarization are directed along different respective paths intersecting with one another in a predetermined recording area so that the interference of each said signal beam and the reference beam will normally produce at said area a single, stationary, readably-distinct line pattern of an individually unique spatial frequency on a recording medium positioned relative to said area, the improvement comprising:

selectively operable control means associated with at least one of said signal beams and effective when operated for cyclically altering its path relative to said reference beam path while maintaining the intersection of said paths at said recording area, such alteration varying in a corresponding manner the phase, at said area, of said signal beam relative to the reference beam to form a moving interference pattern at said area, thereby smearing the readably-distinct line pattern normally produced by that particular signal beam.

3. The apparatus according to claim 2 wherein said control means cyclically alters the path length of said signal beam relative to said area.

4. The apparatus according to claim 2 wherein the selective operation of said control means cyclically alters the phase of its associated signal beam at such frequency that said moving interference pattern appears throughout the recording area as an effectively uniform point-by-point intensity.

5. The apparatus according to claim 2 wherein said reference beam and all said signal beams interfere at the recording area during the selective operation of said control means so that the integrated intensity of all said beams, averaged over said recording area, will remain substantially constant.

6. The apparatus according to claim 2 wherein said control means includes a movable reflecting surface positioned in the path of said signal beam.

7. The apparatus according to claim 2 wherein said control means includes means movable in response to an electrical signal.

8. The apparatus according to claim 1 wherein said signal responsive means is an elastic diaphragm.

9. The apparatus according to claim 7 wherein said signal responsive means is a piezoelectric transducer.

References Cited

UNITED STATES PATENTS

| | | | |
|---|---|---|---|
| 653,881 | 7/1900 | Pollak | 346—109 X |
| 3,312,955 | 4/1967 | Lamberts et al. | 340—173 |
| 3,364,497 | 1/1968 | Mac Adam | 346—108 |

RICHARD B. WILKINSON, *Primary Examiner.*

J. W. HARTARY, *Assistant Examiner.*

U.S. Cl. X.R.

340—173; 346—108